United States Patent Office 3,660,401
Patented May 2, 1972

---

3,660,401
2-(HETEROCYCLIC SUBSTITUTED)QUINOXALINE-1,4-DIOXIDES
Gerald Berkelhammer, Princeton, and Peter Herman Gund, East Windsor, N.J., assignors to American Cyanamid Company, Stamford, Conn.
No Drawing. Filed Oct. 16, 1969, Ser. No. 867,070
Int. Cl. C07d *51/78*
U.S. Cl. 260—250 R         10 Claims

ABSTRACT OF THE DISCLOSURE

This disclosure describes compounds of the class of 2-(heterocyclic substituted)quinoxaline-1,4-dioxides useful as antibacterial agents.

BRIEF SUMMARY OF THE INVENTION

This invention relates to new organic compounds and, more particularly, is concerned with novel 2-(heterocyclic substituted)quinoxaline-1,4-dioxides which may be represented by the following structural formula:

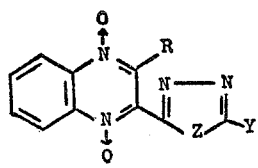

wherein R is hydrogen or lower alkyl, Z is oxygen or sulfur, and Y is amino, mono(lower alkyl)amino, di(lower alkyl)amino, hydroxy or formylamino. Suitable lower alkyl groups contemplated by the present invention are those having up to four carbon atoms such as, for example, methyl, ethyl, n-propyl, isobutyl, sec-butyl, etc.

DETAILED DESCRIPTION OF THE INVENTION

The novel compounds of the present invention are generally obtainable as yellow crystalline materials having characteristic melting points and absorption spectra and which may be purified by recrystallization from organic solvents such as dimethylformamide and dimethylsulfoxide.

The novel compounds of the present invention (where Y is amino or alkyl substituted amino in the above general Formula I) may be readily prepared from a 2-formylquinoxaline-1,4-dioxide and an appropriately substituted semicarbazide or thiosemicarbazide in accordance with the following reaction scheme:

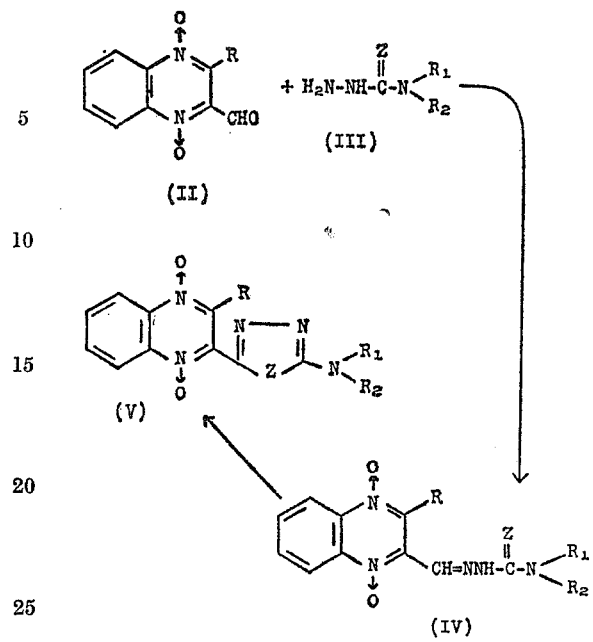

wherein $R_1$ is hydrogen or lower alkyl, $R_2$ is hydrogen or lower alkyl, and R and Z are as hereinabove defined. The initial reaction of the 2-formylquinoxaline-1,4-dioxide (II) with the semicarbazide or thiosemicarbazide (III) is carried out in the presence of an acid catalyst at an elevated temperature (40° C.–100° C.) using equimolar amounts of the reactants. The reaction is generally conducted in a lower alkanol such as methanol, butanol, and the like as solvent and acids such as hydrochloric, hydrobromic, sulfuric or glacial acetic may be used as catalyst. It has been found that the mole ratio of the semicarbazide or thiosemicarbazide (III) and the 2-formylquinoxaline-1,4-dioxide (II) may be varied from about 1:1.5 to about 1.5:1 without seriously affecting product yield although a ratio of about 1:1 is preferred.

The cyclization of the semicarbazones to aminooxadiazoles is conveniently carried out by treatment with bromine and sodium acetate in acetic acid solvent, generally at a temperature between about 25° and 100° C. The thiosemicarbazones are cyclized to aminothiadiazoles by heating in water in the presence of a ferric salt, as for example ferric chloride, ferric ammonium sulfate, ferric nitrate, or ferric sulfate, at a temperature of between about 60° and 100° C.

A 2-[5-amino-1,3,4-(oxa or thia)diazol-2-yl]quinoxaline-1,4-dioxide (where Y is amino in general Formula I) may be formylated with formic acid at an elevated temperature (50° C.–150° C.) whereby the corresponding 5-formamido derivative is obtained. A 2-[5-amino-1,3,4-(oxa or thia)diazol-2-yl]quinoxaline-1,4-dioxide (where Y is amino in general Formula I) gives the corresponding 5-hydroxy derivative upon treatment with an alkali metal nitrite in water under acid conditions and at a reduced temperature, for example between about −10° C. and about 20° C.

The novel compounds of the present invention are valuable antibacterial agents of low toxicity and were shown to possess such activity as determined by animal experiments as follows:

Groups of five day old sex linked pullet chicks are parenterally infected, in the left thoracic air sac, with 0.2 ml. of a $10^{-1}$ dilution of a Trypticase Soy Broth Culture of *Escherichia coli*, the causative agent of colibacillosis in poultry. The test compound is administered by gavage as a single oral dose in an aqueous suspension. Feed and water are furnished and the chicks are permitted free access to both during the twelve day holding period following treatment. At the end of the twelve day period the test is terminated and the survivors for each group counted. The results are compared with infected-untreated and uninfected-untreated control groups. In a representative operation, and merely by way of illustration, the antibacterial efficacy of typical compounds of this invention against the above test organism as determined in the above-described assay are set forth in Table I below:

TABLE I

| Compound | Single oral dose, mg./ kg. of body weight | Survivors/ total |
| --- | --- | --- |
| 2-(5-amino-1,3,4-thiadiazol-2-yl) quinoxaline-1,4-dioxide | 80 | 16/20 |
|  | 40 | 13/20 |
|  | 40 | 15/20 |
| 2-(5-amino-1,3,4-oxadizaol-2-yl) quinoxaline-1,4-dioxide | 40 | 6/20 |
| 2-(1,4-dioxido-2-quinoxalinyl)-$\Delta^2$-1,3,4-thiadiazolin-5-one | 40 | 7/20 |
| Infected-untreated |  | 0/20 |
| Uninfected-untreated |  | 10/10 |

Groups of one day old sex linked chicks are orally infected by gavage with 0.5 ml. of a $10^{-2}$ dilution of a five hour trypticase soy broth culture of *Salomonella gallinarium*, the causative agent of fowl typhoid. Each chick receives about $6 \times 10^5$ viable cells. Medication is administered continuously in the feed, beginning 3 hours before infection and continuing for 10 days, at which time the test is terminated and the number of surviving chicks in each group determined. The results are compared with infected - untreated and uninfected-untreated control groups. Feed and drink are offered ad libitum throughout the test. In a representative operation, and merely by way of illustration, the antibacterial efficacy of typical compounds of this invention against the above test organism as determined in the above described assay are set forth in Table II below:

TABLE II

| Compound | Percent in diet by weight | First test | Second test | Survivors/ total |
| --- | --- | --- | --- | --- |
| 2-(5-amino-1,3,4-thiadiazol-2-yl)-quinoxaline-1,4-dioxide. | 0.10 | 2/5 | 4/5 | 6/10 |
|  | Infected | 0/10 | 0/10 | 0/20 |
|  | Uninfected | 5/5 | 5/5 | 10/10 |
|  | 0.10 | 4/5 | 4/5 | 8/10 |
| 2-(1,4-dioxido-2-quinoxalinyl)-$\Delta^2$-1,3,4-thiadiazolin-5-one. | 0.025 | 2/5 | 3/5 | 5/10 |
|  | Infected | 0/10 | 0/10 | 0/20 |
|  | Uninfected | 5/5 | 5/5 | 10/10 |

In practice it is generally found that from about 0.01 to 0.5% and preferably 0.1% to 0.3% of active ingredient in the feed is effective for controlling Salmonella infections in poultry. It is also found that from about 25 to 250 mg./kg. and preferably from about 40 to 100 mg. of active ingredient per kg. of animal body weight is effective for controlling *Eschericha coli* infections in poultry when administered as a single oral dose.

As antibacterials, the compounds of this invention may be administered orally or parenterally in the usual pharmaceutical forms, or possibly in the diet, and/or compositions of active ingredient in an edible carrier. Such compositions may includes tablets, scored or unscored, or hard or soft shell capsules. Excipients may include lactose, starch, buffers, disintegrating agents, lubricants, homogenizing agents, and the like. Oral and parenteral compositions may include similar agents and also preservatives, emulsifiers, surfactants, stabilizers and the like in solutions, suspensions, syrups, elixirs, etc. in either aqueous or non-aqueous systems. Additional excipients might include sweeteners, flavorings, colorings, or perfumes. Topical preparations, it is expected, will prove particularly useful. Such compositions would be designed for administration to subjects exposed to, or infected with sensitive bacteria for either treatment or prophylaxis and may include, in addition to the foregoing, ointments, creams, emulsions, unguents, salves, emollients, sprays, washes or the like. In addition, compounds of this invention may be used in the form of solutions, suspensions, emulsions, washes, powders, dusts, mists, soap sprays, aerosols, drenches, or other forms of the purpose of cleaning, disinfecting, or sterilizing surgical instruments, laboratory glassware or instruments, hospital walls or other surfaces, linens, dishes, laboratory tables, coops, cages, or the like. Likewise these compounds might be incorporated into soaps, detergents, sprays or the like in the home, farm, office or elsewhere with the purpose of preventing or minimizing infection or contamination with sensitive bacteria. Painting, spraying, immersion or other means of effecting contact may be applied.

Certain of the novel 2-(heterocyclic substituted)-quinoxaline-1,4-dioxides of the present invention may exist in other tautomeric forms as follows:

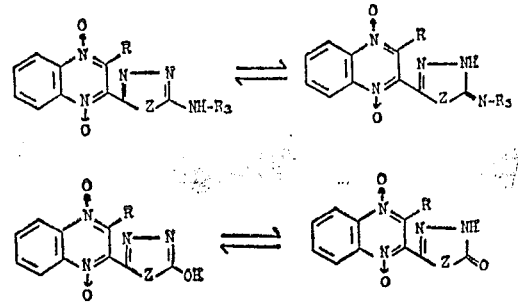

wherein $R_3$ is hydrogen, formyl or lower alkyl, and R and Z are as hereinabove defined. All such tautomeric forms are, therefore, included within the purview of the present invention and the description of one form is intended to include the tautomer thereof.

The invention will be described in greater detail in conjunction with the following specific examples.

EXAMPLE 1

Preparation of 2-formyl-3-ethylquinoxaline-1,4-dioxide semicarbazone

A mixture of 2.2 g. (0.01 mole) of 2-formyl-3-ethylquinoxaline-1,4-dioxide and 1.1 g. (0.01 mole) of semicarbazide hydrochloride in 150 ml. of methanol is heated to homogeneity and stirred for three hours. The solid product is collected by filtration and dried.

EXAMPLE 2

Preparation of 2-formylquinoxaline-1,4-dioxide-4-ethylsemicarbazone

A mixture of 2.0 g. of 2-formylquinoxaline-1,4-dioxide and 1.4 g. of 4-ethylsemicarbazide hydrochloride in 150 ml. of methanol is heated to homogeneity and stirred for three hours. The solid product is collected by filtration and dried.

EXAMPLE 3

The general procedure of Examples 1 and 2 is repeated using a series of different reagents. These reagents and the corresponding products are set forth in the following table.

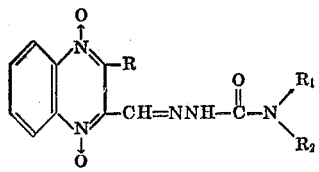

| Starting materials | | Products | | |
|---|---|---|---|---|
| Quinoxaline | Semicarbazide | R | R₁ | R₂ |
| 2-formylquinoxaline-1,4-dioxide | Semicarbazide hydrochloride | H | H | H. |
| 2-formyl-3-methylquinoxaline-1,4-dioxide | ....do.... | Methyl | H | H. |
| 2-formyl-3-n-butylquinoxaline-1,4-dioxide | ....do.... | n-butyl | H | H. |
| 2-formyl-3-sec-butylquinoxaline-1,4-dioxide | 4-methylsemicarbazide hydrochloride | sec-Butyl | H | Methyl. |
| 2-formyl-3-n-propylquinoxaline-1,4-dioxide | 4-isopropylsemicarbazide hydrochloride | n-Propyl | H | Isopropyl. |
| 2-formyl-3-methylquinoxaline-1,4-dioxide | 4-ethylsemicarbazide hydrochloride | Methyl | H | Ethyl. |
| 2-formylquinoxaline-1,4-dioxide | 4-methyl-4-isobutylsemicarbazide hydrochloride | H | Methyl | Isobutyl. |
| 2-formyl-3-methylquinoxaline-1,4-dioxide | 4,4-diethylsemicarbazide hydrochloride | Methyl | Ethyl | Ethyl. |
| 2-formyl-3-isopropylquinoxaline-1,4-dioxide | 4,4-dimethylsemicarbazide hydrochloride | Isopropyl | Methyl | Methyl. |

EXAMPLE 4

Preparation of 2-formyl-3-methylquinoxaline-1,4-dioxide thiosemicarbazone

A mixture of 4.8 g. (0.05 mole) of thiosemicarbazide and 10.3 g. (0.05 mole) of 2-formyl-3-methylquinoxaline-1,4-dioxide in 500 ml. of 95% ethanol is heated with stirring, and three drops of concentrated hydrochloric acid are added as catalyst. After heating at 70° C. for one hour, the reaction mixture is cooled and filtered whereby the solid product is obtained.

EXAMPLE 5

Preparation of 2-formylquinoxaline-1,4-dioxide 4-methylthiosemicarbazone

A mixture of 4.0 g. (0.02 mole) of 2-formylquinoxaline-1,4-dioxide, 1.8 g. (0.02 mole) of 4-methylthiosemicarbazide, and one drop of concentrated hydrochloric acid in 100 ml. of methanol is warmed with stirring for three hours. The product is removed by filtration, washed with methanol, and dried.

EXAMPLE 6

Preparation of 2-formylquinoxaline-1,4-dioxide 4,4-dimethylthiosemicarbazone

A mixture of 4.0 g. (0.02 mole) of 2-formylquinoxaline-1,4-dioxide, 2.0 g. (0.02 mole) of 4,4-dimethylthiosemicarbazide, and two drops of concentrated hydrochloric acid in 100 ml. of ethanol is warmed with stirring for three hours. The product is removed by filtration, washed with methanol, and dried.

EXAMPLE 7

The general procedure of Examples 4, 5 and 6 is repeated using a series of different reagents. These reagents and the corresponding products are set forth in the following table.

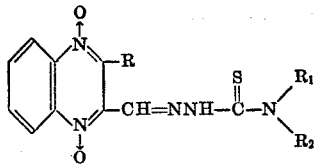

| Starting materials | | Products | | |
|---|---|---|---|---|
| Quinoxaline | Thiosemicarbazide | R | R₁ | R₂ |
| 2-formylquinoxaline-1,4-dioxide | Thiosemicarbazide | H | H | H. |
| 2-formyl-3-ethylquinoxaline-1,4-dioxide | ....do.... | Ethyl | H | H. |
| 2-formyl-3-isobutylquinoxaline-1,4-dioxide | ....do.... | Isobutyl | H | H. |
| 2-formylquinoxaline-1,4-dioxide | 4-sec-butylthiosemicarbazide | H | H | sec-Butyl. |
| 2-formyl-3-n-propylquinoxaline-1,4-dioxide | 4-isopropylthiosemicarbazide | n-Propyl | H | Isopropyl. |
| 2-formyl-3-n-butylquinoxaline-1,4-dioxide | 4-ethylthiosemicarbazide | n-Butyl | H | Ethyl. |
| 2-formylquinoxaline-1,4-dioxide | 4,4-diisopropylthiosemicarbazide | H | Isopropyl | Isopropyl. |
| 2-formyl-3-methylquinoxaline-1,4-dioxide | 4,4-diethylthiosemicarbazide | Methyl | Ethyl | Ethyl. |
| 2-formyl-3-isopropylquinoxaline-1,4-dioxide | 4-methyl-4-ethylthiosemicarbazide | Isopropyl | Methyl | Do. |

EXAMPLE 8

Preparation of 2-(5-amino-1,3,4-oxadiazol-2-yl) quinoxaline-1,4-dioxide

A mixture of 5.0 g. (0.02 mole) of 2-formylquinoxaline-1,4-dioxide semicarbazone and 8.0 g. (0.1 mole) of sodium acetate in 40 ml. of glacial acetic acid is stirred as 3.2 g. (0.02 mole) of bromine in 15 ml. of acetic acid is added slowly in portions. The reaction mixture is heated at 69° C. for 3.5 hours with stirring, cooled to room temperature, and poured over crushed ice. The product is removed by filtration, washed with water, 95% ethanol, and then ether to give 4.7 g. (96% yield) of product as a dark yellow powder, M.P. 199°–201° C.

Recrystallization from 120 ml. of boiling dimethylformamide gives 2.6 g. of product, M.P. 248°–249° C. Recrystallized and crude product are identical by thin layer chromatography.

EXAMPLE 9

Preparation of 2-(5-amino-1,3,4-oxadiazol-2-yl)-3-ethylquinoxaline-1,4-dioxide

A mixture of 2.7 g. of 2-formyl-3-ethylquinoxaline-1,4-dioxide semicarbazone and 4.0 g. of sodium acetate in 25 ml. of glacial acetic acid is stirred as 1.6 g. of bromine in 10 ml. of acetic acid is added slowly in portions. The reaction mixture is heated on the steam bath for 3.5 hours and then poured over crushed ice. The product is removed by filtration and washed with ethanol.

EXAMPLE 10

Preparation of 2-(5-ethylamino-1,3,4-oxadiazol-2-yl)quinoxaline-1,4-dioxide

A mixture of 4.0 g. of 2-formylquinoxaline-1,4-dioxide 4-ethylsemicarbazone and 4.0 g. of sodium acetate in 25 ml. of glacial acetic acid is stirred as 2.4 g. of bromine in 10 ml. of acetic acid is added slowly in portions. The reaction mixture is heated on the steam bath for 3.5 hours and then poured over crushed ice. The product is removed by filtration and washed with ethanol.

EXAMPLE 11

The general procedure of Examples 8, 9, and 10 is repeated using a series of different starting materials. These starting materials and the corresponding products are set forth in the following table.

tion mixture is cooled to room temperature and filtered. The product is washed on the filter with water and 95% ethanol to give 25.6 g. (98% yield) of crude product as a yellow powder, M.P. 278°–280° C. dec. An analytical sample (M.P. 285°–287° C. dec.) may be prepared by recrystallizing from dimethylformamide.

EXAMPLE 13

Preparation of 2-(5-amino-1,3,4-thiadiazol-2-yl)-3-methylquinoxaline-1,4-dioxide A mixture of 13.9 g. (0.05 mole) of 2-formyl-3-methylquinoxaline-1,4-dioxide thiosemicarbazone and 42.0 g. (0.156 mole) of ferric chloride hexahydrate in 1250 ml. of water are heated at reflux for 3.5 hours with stirring. The heterogeneous reaction mixture is filtered and the solid product is washed on the filter with 95% ethanol.

EXAMPLE 14

Preparation of 2-(5-methylamino-1,3,4-thiadiazol-2-yl)quinoxaline-1,4-dioxide

A mixture of 2.8 g. (0.01 mole) of 2-formylquinoxaline-1,4-dioxide 4-methylthiosemicarbazone and 8.0 g. (0.03 mole) of ferric chloride hexahydrate in 200 ml. of water is heated at reflux with stirring for three hours. Cooling and filtering the reaction mixture gives the yellow solid product.

EXAMPLE 15

Preparation of 2-(5-dimethylamino-1,3,4-thiadiazol-2-yl)quinoxaline-1,4-dioxide

A mixture of 5.8 g. (0.02 mole) of 2-formylquinoxaline-1,4-dioxide 4,4-dimethylthiosemicarbazone and 16.0

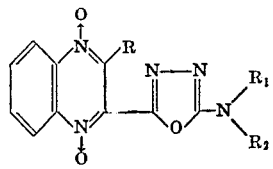

| Starting materials | Products | | |
|---|---|---|---|
| | R | $R_1$ | $R_2$ |
| 2-formyl-3-methylquinoxaline-1,4-dioxide semicarbazone | Methyl | H | H. |
| 2-formyl-3-n-butylquinoxaline-1,4-dioxide semicarbazone | n-Butyl | H | H. |
| 2-formyl-3-sec-butylquinoxaline-1,4-dioxide 4-methylsemicarbazone | sec-Butyl | H | Methyl. |
| 2-formyl-3-n-propylquinoxaline-1,4-dioxide 4-isopropylsemicarbazone | n-Propyl | H | Isopropyl. |
| 2-formyl-3-methylquinoxaline-1,4-dioxide 4-ethylsemicarbazone | Methyl | H | Ethyl. |
| 2-formylquinoxaline-1,4-dioxide 4-methyl-4-isobutylsemicarbazone | H | Methyl | Isobutyl. |
| 2-formyl-3-methylquinoxaline-1,4-dioxide 4,4-diethylsemicarbazone | Methyl | Ethyl | Ethyl. |
| 2-formyl-3-isopropylquinoxaline-1,4-dioxide 4,4-dimethylsemicarbazone | Isopropyl | Methyl | Methyl. |

EXAMPLE 12

Preparation of 2-(5-amino-1,3,4-thiadiazol-2-yl)quinoxaline-1,4-dioxide

A solution of 79.0 g. (0.29 mole) of ferric chloride hexahydrate in 1500 ml. of water is stirred while 25.8 g. (0.10 mole) of 2-formylquinoxaline-1,4-dioxide thiosemicarbazone is added, followed by 500 ml. of water. After heating at reflux with stirring for three hours, the reacg. (0.06 mole) of ferric chloride hexahydrate in 400 ml. of water is heated at reflux with stirring for three hours. Cooling and filtering the reaction mixture gives the yellow solid product.

EXAMPLE 16

The general procedure of Examples 12, 13, 14 and 15 is repeated using a series of different starting materials. These starting materials and the corresponding products are set forth in the following table.

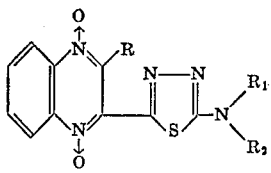

| Starting materials | Products | | |
|---|---|---|---|
| | R | $R_1$ | $R_2$ |
| 2-formyl-3-ethylquinoxaline-1,4-dioxide thiosemicarbazone | Ethyl | H | H. |
| 2-formyl-3-isobutylquinoxaline-1,4-dioxide thiosemicarbazone | Isobutyl | H | H. |
| 2-formylquinoxaline-1,4-dioxide 4-sec-butylthiosemicarbazone | H | H | sec-Butyl. |
| 2-formyl-3-n-propylquinoxaline-1,4-dioxide 4-isopropylthiosemicarbazone | n-Propyl | H | Isopropyl. |
| 2-formyl-3-n-butylquinoxaline-1,4-dioxide 4-ethylthiosemicarbazone | n-Butyl | H | Ethyl. |
| 2-formylquinoxaline-1,4-dioxide 4,4-diisopropylthiosemicarbazone | H | Isopropyl | Isopropyl. |
| 2-formyl-3-methylquinoxaline-1,4-dioxide 4,4-diethylthiosemicarbazone | Methyl | Ethyl | Ethyl. |
| 2-formyl-3-isopropylquinoxaline-1,4-dioxide 4-methyl-4-ethylthiosemicarbazone | Isopropyl | Methyl | Do. |

EXAMPLE 17

Preparation of 2-(1,4-dioxido-2-quinoxalinyl)-Δ²-1,3,4-thiadiazolin-5-one

A mixture of 3.1 g. (0.012 mole) of 2-(5-amino-1,3,4-thiadiazol-2-yl)quinoxaline-1,4-dioxide, 13 ml. of water, and 65 ml. of concentrated sulfuric acid is cooled with stirring in an ice-methanol bath. A solution of 2.9 g. (0.043 mole) of sodium nitrate in 13 ml. of water is added dropwise with stirring and cooling to maintain the temperature below 10° C. After an additional hour at 0° C., the mixture is stirred at room temperature overnight. The reaction mixture is poured over crushed ice and partially neutralized by adding 125 ml. of 10 N sodium hydroxide solution with stirring and addition of ice to maintain a temperature between —10° and 0° C. The resulting product is filtered and washed thoroughly with water, 95% ethanol, and ether to yield 2.8 g. (89% yield) of yellow powder, M.P. 284°–286° C.

EXAMPLE 18

The general procedure of Example 17 is repeated using a series of different starting materials. These starting materials and the corresponding products are set forth in the following table.

is heated at reflux with stirring for 6 hours, evaporated to dryness, and the solid product washed with aqueous bicarbonate solution and water.

EXAMPLE 20

The general procedure of Example 19 is repeated using a series of different starting materials. These starting materials and the corresponding products are set forth in the following table.

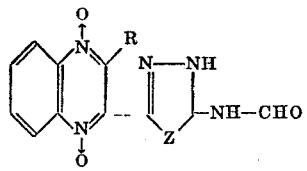

| | Products | |
|---|---|---|
| Starting materials | Z | R |
| 2-(5-amino-1,3,4-oxadiazol-2-yl)quinoxaline-1,4-dioxide | O | H. |
| 2-(5-amino-1,3,4-oxadiazol-2-yl)-3-ethylquinoxaline-1,4-dioxide | O | Ethyl. |
| 2-(5-amino-1,3,4-oxadiazol-2-yl)-3-methylquinoxaline-1,4-dioxide | O | Methyl. |
| 2-(5-amino-1,3,4-oxadiazol-2-yl)-3-n-butylquinoxaline-1,4-dioxide | O | n-Butyl. |
| 2-(5-amino-1,3,4-thiadiazol-2-yl)-3-methylquinoxaline-1,4-dioxide | S | Methyl. |
| 2-(5-amino-1,3,4-thiadiazol-2-yl)-3-ethylquinoxaline-1,4-dioxide | S | Ethyl. |
| 2-(5-amino-1,3,4-thiadiazol-2-yl)-3-isobutylquinoxaline-1,4-dioxide | S | Isobutyl. |

We claim:
1. A compound selected from the group consisting of 2-(heterocyclic substituted)quinoxaline - 1,4 - dioxides of the formula:

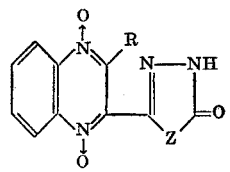

and the tautomers thereof; wherein R is selected from the group consisting of hydrogen and lower alkyl, Z is selected from the group consisting of oxygen and sulfur, and Y is selected from the group consisting of amino, mono-(lower alkyl)amino, di(lower alkyl)amino, hydroxy and formylamino.

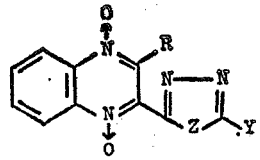

| | Products | |
|---|---|---|
| Starting materials | Z | R |
| 2-(5-amino-1,3,4-oxadiazol-2-yl)quinoxaline-1,4-dioxide | O | H. |
| 2-(5-amino-1,3,4-oxadiazol-2-yl)-3-ethylquinoxaline-1,4-dioxide | O | Ethyl. |
| 2-(5-amino-1,3,4-oxadiazol-2-yl)-3-methylquinoxaline-1,4-dioxide | O | Methyl. |
| 2-(5-amino-1,3,4-oxadizaol-2-yl)-3-n-butylquinoxaline-1,4-dioxide | O | n-Butyl. |
| 2-(5-amino-1,3,4-thiadiazol-2-yl)-3-methylquinoxaline-1,4-dioxide | S | Methyl. |
| 2-(5-amino-1,3,4-thiadiazol-2-yl)-3-ethylquinoxaline-1,4-dioxide | S | Ethyl. |
| 2-(5-amino-1,3,4-thiadiazol-2-yl)-3-isobutylquinoxaline-1,4-dioxide | S | Isobutyl. |

EXAMPLE 19

Preparation of 2-(5-formamido-1,3,4-thiadiazol-2-yl) quinoxaline-1,4-dioxide

A mixture of 15 g. of 2-(5-amino-1,3,4-thiadiazol-2-yl)quinoxaline-1,4-dioxide in 75 ml. of 95% formic acid 2. A compound according to claim 1 wherein R is hydrogen, Z is oxygen, and Y is amino.
3. A compound according to claim 1 wherein R is ethyl, Z is oxygen, and Y is amino.
4. A compound according to claim 1 wherein R is hydrogen, Z is oxygen, and Y is ethylamino.

5. A compound according to claim 1 wherein R is hydrogen, Z is sulfur, and Y is amino.

6. A compound according to claim 1 wherein R is methyl, Z is sulfur, and Y is amino.

7. A compound according to claim 1 wherein R is hydrogen, Z is sulfur, and Y is methylamino.

8. A compound according to claim 1 wherein R is hydrogen, Z is sulfur, and Y is dimethylamino.

9. A compound according to claim 1 wherein R is hydrogen, Z is sulfur, and Y is hydroxy.

10. A compound according to claim 1 wherein R is hydrogen, Z is sulfur, and Y is formylamino.

References Cited

UNITED STATES PATENTS 3,493,572   2/1970   Johnston _____ 260—250 R

NICHOLAS S. RIZZO, Primary Examiner

U.S. Cl. X.R.

424—250